United States Patent
Oka

(10) Patent No.: US 9,304,254 B2
(45) Date of Patent: Apr. 5, 2016

(54) SUBSTRATE-TYPE WAVEGUIDE ELEMENT AND OPTICAL MODULATOR

(71) Applicant: FUJIKURA LTD., Tokyo (JP)

(72) Inventor: Akira Oka, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/617,155

(22) Filed: Feb. 9, 2015

(65) Prior Publication Data

US 2015/0234121 A1    Aug. 20, 2015

(30) Foreign Application Priority Data

Feb. 17, 2014  (JP) ................................. 2014-027743

(51) Int. Cl.
| | | |
|---|---|---|
| *G02F 1/01* | (2006.01) | |
| *G02B 6/126* | (2006.01) | |
| *F21V 8/00* | (2006.01) | |
| *G02B 6/27* | (2006.01) | |
| *G02B 6/12* | (2006.01) | |

(52) U.S. Cl.
CPC .............. *G02B 6/126* (2013.01); *G02B 6/0048* (2013.01); *G02B 6/2773* (2013.01); *G02B 2006/12147* (2013.01)

(58) Field of Classification Search
CPC .......... G02B 6/105; G02B 6/126; G02B 6/26; G02B 2006/12147; G02B 6/2726; G02B 6/2804; G02B 6/2733; G02B 6/2932; G02B 6/036
USPC .......... 385/1, 11, 14, 30, 39, 41–43, 129–132
See application file for complete search history.

(56) References Cited

U.S. PATENT DOCUMENTS

| | | | | |
|---|---|---|---|---|
| 7,263,247 | B1 * | 8/2007 | Hehlen et al. ................... | 385/14 |
| 8,150,219 | B2 * | 4/2012 | Nasu et al. ....................... | 385/11 |
| 2006/0018584 | A1 * | 1/2006 | Watts et al. ..................... | 385/11 |
| 2006/0222282 | A1 * | 10/2006 | Salib et al. ....................... | 385/11 |

OTHER PUBLICATIONS

Dong et al., "112-Gb/s Monolithic PDM-QPSK Modulator in Silicon", European Conference and Exhibition on Optical Communication, 2012, p. Th.3.B.1, vol. 1.
Dong et al., "112-Gb/s monolithic PDM-QPSK modulator in silicon", Optics Express, 2012, pp. B624-B629, vol. 20, No. 26.
Dai et al., "Ultrashort broadband polarization beam splitter based on an asymmetrical directional coupler", Optics Letter, Jul. 1, 2011, pp. 2590-2592, vol. 36, No. 13.
Fukuda et al., "Ultrasmall polarization splitter based on silicon wire waveguides", Optics Express, Dec. 11, 2006, pp. 12401-12408, vol. 14, No. 25, cited in the Specification.

* cited by examiner

*Primary Examiner* — Kaveh C Kianni
*Assistant Examiner* — Hung Lam
(74) *Attorney, Agent, or Firm* — Westerman, Hattori, Daniels & Adrian, LLP

(57) ABSTRACT

Since a cross section of at least a partial segment of a first core has a step-like shape including a quadrilateral shape of a main part and a quadrilateral shape of a protruding part protruding from the main part, respective effective refractive indices of TE polarized waves in the first core and in the second core differ from each other.

10 Claims, 10 Drawing Sheets

SUBSTRATE-TYPE WAVEGUIDE ELEMENT AND OPTICAL MODULATOR

This Nonprovisional application claims priority under 35 U.S.C. §119 on Patent Application No. 2014-027743 filed in Japan on Feb. 17, 2014, the entire contents of which are hereby incorporated by reference.

TECHNICAL FIELD

The present invention relates to (i) a substrate-type waveguide element configured such that a TM polarized wave inputted from a first core is outputted from a second core and (ii) an optical modulator including the substrate-type waveguide element.

BACKGROUND ART

The amount of information to be transmitted via optical communication is steadily increasing. In order to match up to such an increase in the amount of information, attempts are being made such as an increase in signal speed and an increase in the number of channels by wavelength-division multiplexing. A next-generation 100-Gbps digital coherent transmission technology which is intended for high-speed information communication, in particular, attempts to double the amount of information to be communicated per unit of time by polarization-division multiplexing. Note that "polarization-division multiplexing" herein refers to superimposing pieces of information of two polarized waves (such as TM polarized wave and TE polarized wave) which have respective electric fields orthogonal to each other.

However, in a case where polarization-division multiplexing is carried out, a configuration of an optical modulator becomes complex. This results in problems such as increases in device size and production costs. In view of the circumstances, attempts have been made to realize an optical modulator that carries out polarization-division multiplexing by use of a substrate-type waveguide element including a silicon waveguide which can be easily processed and which is capable of a reduction in device size by integration and capable of a reduction in production costs by mass production.

The optical modulator to carry out polarization-division multiplexing is equipped with, for example, a polarized beam combiner which combines together a TM polarized wave including a piece of information and a TE polarized wave including another piece of information. As a technology for causing a substrate-type waveguide element to serve as such a polarized beam combiner, for example, a technology disclosed in Non-Patent Literature 1 is known.

FIG. 9 shows a substrate-type waveguide element 5 disclosed in Non-Patent Literature 1. (a) of FIG. 9 is a cross-sectional view of the substrate-type waveguide element 5. (b) and (c) of FIG. 9 are plan views of the substrate-type waveguide element 5 (a lower cladding 51 and an upper cladding 52 are not illustrated).

As illustrated in (a) of FIG. 9, the substrate-type waveguide element 5 includes (i) a lower cladding 51 made of silica ($SiO_2$), (ii) two cores 53 and 54, each made of silicon (Si), which are provided on the lower cladding 51, (iii) an upper cladding 52, made of silica, which is provided on the lower cladding 51 so as to bury the two cores 53 and 54. The two cores 53 and 54 have congruent rectangular cross sections (see (a) of FIG. 9), and are provided so that their respective side surfaces are in the proximity of each other in a partial segment (segment enclosed in dotted lines; see (b) and (c) of FIG. 9). Hereinafter, the segment, in which the respective side surfaces of the two cores 53 and 54 are in the proximity of each other, will be also referred to as "parallel segment."

The substrate-type waveguide element 5 is designed so that a length L of the parallel segment, in which the two cores 53 and 54 run parallel to each other, matches a coupling length with respect to a TM0 polarized wave. Therefore, as illustrated in (b) of FIG. 9, inputting a TM0 polarized wave and a TE0 polarized wave into the first core 53 causes the TM0 polarized wave to be outputted from the second core 54 and causes the TE0 polarized wave to be outputted from the first core 53. In other words, the substrate-type waveguide element 5 serves as a polarized beam splitter that separates the TM0 polarized wave and the TE0 polarized wave from each other. In addition, as illustrated in (c) of FIG. 9, inputting a TM0 polarized wave into the first core 53 and inputting a TE0 polarized wave into the second core 54 causes the TM0 polarized wave and the TE0 polarized wave to be outputted from the second core 54. In other words, the substrate-type waveguide element 5 serves also as a polarized beam combiner that combines the TM0 polarized wave and the TE0 polarized wave together.

Note that "TE polarized wave" herein refers to a polarization mode having an electric field whose main component oscillates in a direction (i) orthogonal to a traveling direction of light propagating in a core and (ii) parallel to a direction in which a boundary surface between an upper cladding and a lower cladding extends. In particular, a TE polarized wave having a maximum effective refractive index is referred to as "TE0 polarized wave." Note also that "TM polarized wave" herein refers to a polarization mode having an electric field whose main component oscillates in a direction (i) orthogonal to a traveling direction of light propagating in a core and (ii) perpendicular to a direction in which a boundary surface between an upper cladding and a lower cladding extends. In particular, a TM polarized wave having a maximum effective refractive index is referred to as "TM0 polarized wave."

As described above, the substrate-type waveguide element 5 is configured such that (i) a TM0 polarized wave inputted into the first core 53 is outputted from the second core 54 whereas a TE0 polarized wave inputted into the first core 53 is outputted mainly from the first core 53 and (ii) a TE0 polarized wave inputted into the second core 54 is outputted mainly from the second core 54. An explanation of the configuration is as follows:

First, a coupling efficiency T of the substrate-type waveguide element 5 with respect to each polarization mode (a polarization mode to be focused will be hereinafter referred to as "target mode") is obtained, as a function of the length L of the parallel segment in which the two cores 53 and 54 run parallel to each other, by Equation (1) at large. Note that "coupling efficiency" herein means a ratio of power of a target mode outputted from the second core 54 to power of the target mode inputted into the first core 53 (or a ratio of power of a target mode outputted from the first core 53 to power of the target mode inputted into the second core 54). The definitions of "F" and "q" in Equation (1) are as shown in Equation (2) and Equation (3).

[Equation (1)]

$$T = F\sin^2(qL) \qquad (1)$$

[Equation (2)]

$$F = \frac{1}{1+\left(\dfrac{\delta}{\chi}\right)^2} \qquad (2)$$

[Equation (3)]

$$q = \sqrt{\chi^2 + \delta^2} \quad (3)$$

Note that δ is a coefficient defined by Equation (4), wherein (i) a difference between an effective refractive index of a target mode to be guided through the first core 53 (effective refractive index in a case where the second core 54 does not exist) and an effective refractive index of a target mode to be guided through the second core 54 (effective refractive index in a case where the first core 53 does not exist) is $\Delta N_1$ and (ii) a wavelength of the target mode is λ.

[Equation (4)]

$$\delta = \frac{\pi}{\lambda} \Delta N_I \quad (4)$$

x (referred to as "coupling coefficient") is obtained by Expression (5), wherein (i) a refractive index distribution of a core cross section in a case where only the first core 53 exists (in a case where the second core 54 does not exist) is $N_1$, (ii) a refractive index distribution of core cross sections in a case where the first core 53 and the second core 54 both exist is N, (iii) an electric field vector of a target mode to be guided through the first core 53 is $E_1$, and (iv) an electric field vector of a target mode to be guided through the second core 54 is $E_2$.

[Expression 5]

$$\chi \propto \int_{-\infty}^{\infty} \int_{-\infty}^{\infty} (N^2 - N_1^2) E_1^* \cdot E_2 \, dx \, dy \quad (5)$$

Note that the coupling coefficient x is obtained by integrating, at the core cross sections, an inner product of the electric field vector $E_1$ of the target mode to be guided through the first core 53 and the electric field vector $E_2$ of the target mode to be guided through the second core 54. Therefore, a larger amount by which the target mode guided through each of the two cores 53 and 54 escapes into a cladding results in a larger coupling coefficient x. A high degree of optical coupling between the target modes guided through the two cores 53 and 54 clearly indicates a large value of the coupling coefficient x defined by Expression (5).

In addition, sin(qL) shown in Equation (1) becomes 1 when the length L of the parallel segment, in which the two cores 53 and 54 run parallel to each other, matches $L_c$ defined by Equation (6). The $L_c$ defined by Equation (6) is referred to as "coupling length." Note that the coupling length $L_c$ is obtained for each polarization mode. Hereinafter, a coupling length with respect to a TM0 polarized wave will be described as $L_c$ (TM0), and a coupling length with respect to a TE0 polarized wave will be described as $L_c$ (TE0).

[Equation (6)]

$$L_C = \frac{\pi}{2q} = \frac{\pi}{2\sqrt{\chi^2 + \delta^2}} \quad (6)$$

The following description is an explanation of the configuration of the substrate-type waveguide element 5 such that a TM0 polarized wave inputted into the first core 53 is outputted from the second core 54. According to the substrate-type waveguide element 5, the two cores 53 and 54 have identical cross-sectional shapes. This causes the difference $\Delta N_1$ in effective refractive index between the two cores 53 and 54 with respect to each polarization mode to be 0. Therefore, "F" shown in Equation (1) becomes 1. In addition, the substrate-type waveguide element 5 is designed so that the length L of the parallel segment, in which the two cores 53 and 54 run parallel to each other, matches the coupling length $L_c$ (TM0) with respect to a TM0 polarized wave. This causes sin(qL) shown in Equation (1) to be 1. Therefore, the coupling efficiency T (TM0) with respect to the TM0 polarized wave becomes 1. This means that a TM0 polarized wave inputted into the first core 53 is outputted from the second core 54 without exception.

Meanwhile, the coupling length $L_c$ with respect to each polarization mode has wavelength dependency. For example, a longer wavelength λ results in a larger amount by which a TM0 polarized wave guided through each of the two cores 53 and 54 escapes. Therefore, a longer wavelength λ causes optical coupling between the TM0 polarized waves guided through the two cores 53 and 54 to be stronger, and consequently causes the coupling length $L_c$ (TM0) with respect to the TM0 polarized waves. Note that the length L of the parallel segment, in which the two cores 53 and 54 run parallel to each other, match the coupling length $L_c$ (TM0) with respect to a TM0 polarized wave having a design wavelength which has been predetermined. Therefore, it is not possible to avoid losing a TM0 polarized wave having a wavelength outside the design wavelength. However, stronger optical coupling between the TM0 polarized waves guided through the two cores 53 and 54 causes the wavelength dependency of the coupling length $L_c$ (TM0) to be small. Therefore, the optical coupling between the TM0 polarized waves guided through the two cores 53 and 54 is preferably strong in order to restrict, to a low amount, an amount of loss of a TM0 polarized wave having a wavelength outside the design wavelength.

The following is an explanation of the configuration of the substrate-type waveguide element 5 such that (i) a TE0 polarized wave inputted into the first core 53 is outputted mainly from the first core 53 and (ii) a TE0 polarized wave inputted into the second core 54 is outputted mainly from second core 54. A coupling length $L_c$ (TE0) with respect to a TE0 polarized wave does not match but is longer than a coupling length $L_c$ (TM0) with respect to a TM0 polarized wave. Therefore, as shown in Equation (7), a coupling efficiency T (TE0) with respect to a TE0 polarized wave is smaller than a coupling efficiency T (TM0) with respect to a TM0 polarized wave (TM0=1). This (i) causes only a part of a TE0 polarized wave inputted into the first core 53 to be outputted from the second core 54 and (ii) causes a remaining part of the TE0 polarized wave to be outputted from the first core 53. Likewise, only part of a TE0 polarized wave inputted into the second core 54 is outputted from the first core 53, and a remaining part of the TE0 polarized wave is outputted from the second core 54.

[Equation 7]

$$T(TE0) = \sin^2\left(\frac{\pi}{2} \frac{Lc(TM0)}{Lc(TE0)}\right) < 1 \quad (7)$$

CITATION LIST

Non-Patent Literature

Non-Patent Literature 1

Hiroshi Fukuda, et al., "Ultrasmall polarization splitter based on silicon wire waveguides," OPTICS EXPRESS, Vol. 14, No. 25, 12401 (2006).

SUMMARY OF INVENTION

Technical Problem

When the conventional substrate-type waveguide element 5 serves as a polarized beam combiner, loss of a TM0 polarized wave and a polarization extinction ratio of the TM0 polarized wave are examples of an important performance indicator of the substrate-type waveguide element 5.

Loss of a TM0 polarized wave is an indicator indicative of a reduced amount of power of the TM0 polarized wave outputted from the second core 54 in comparison with power of the TM0 polarized wave inputted into the first core 53. A value of the loss is preferably small.

On the other hand, as illustrated in FIG. 10, a polarization extinction ratio is an indicator indicative of how smaller power of a TE0 polarized wave outputted from the second core 54 is in comparison with power of a TM0 polarized wave outputted from the second core 54 in a case where the TM0 polarized wave and the TE0 polarized wave having identical powers are inputted into the first core 53. The polarization extinction ratio is defined by Equation (8). Note that "output port" shown in Equation (8) represents an output terminal of the second core 54.

[Equation (8)]

$$PER = 10 \, \text{Log}_{10} \frac{\text{Power of } TM0 \text{ Polarized Wave at Output Port}}{\text{Power of } TE0 \text{ Polarized Wave at Output Port}} \quad (8)$$

A lower polarization extinction ratio causes a TE0 polarized wave, which is inputted as a signal into the second core 54, to be more easily contaminated with a TE0 polarized wave inputted into the first core 53 as a noise mixed in a TM0 polarized wave. Therefore, the polarization extinction ratio is preferably high.

As a first method to increase the polarization extinction ratio of the polarized beam combiner 5, there is a method disclosed in Non-Patent Literature 1 in which a plurality of polarized beam combiners 5 are coupled together. By employing the method, a polarization extinction ratio is increased according to the number of coupled polarized beam combiners 5. In a case where the method is employed, however, it is not possible to sufficiently transfer, from one core to the other, a TM0 polarized wave having a wavelength outside a design wavelength. This prevents loss of the TM0 polarized waves across a wide range of wavelengths from being restrict to a low amount. In addition, it is not possible to avoid an increase in device size according to an increase in the number of polarized beam combiners 5.

As a second method to increase the polarization extinction ratio of the polarized beam combiner 5, there is a method in which (i) respective widths of the two cores 53 and 54 are widened and/or (ii) a space between the two cores 53 and 54 is enlarged. In a case where the respective widths of the two cores 53 and 54 are widened, a TE0 polarized wave and a TM0 polarized wave are increasingly confined to each of the two cores 53 and 54. In so doing, a degree to which the TE0 polarized wave is confined exceeds a degree to which the TM0 polarized wave is confined. This causes the polarization extinction ratio to be increased. In addition, in a case where the space between the two cores 53 and 54 is enlarged, optical coupling between the TE0 polarized waves guided through the two cores 53 and 54 and optical coupling between the TM0 polarized waves guided through two cores 53 and 54 are each decreased. In so doing, a degree to which the optical coupling between the TE0 polarized waves is decreased exceeds a degree to which the optical coupling between the TE0 polarized waves is decreased. This causes the polarization extinction ratio to be increased. However, in the case where the respective widths of the two cores 53 and 54 are widened, it is impossible as described above to avoid causing the TM0 polarized waves to be increasingly confined to the two cores 53 and 54. In the case where the space between the two cores 53 and 54 is enlarged, it is impossible as described above to avoid causing the optical coupling between the TM0 polarized waves guided through the two cores 53 and 54 to be decreased. This poses a problem of causing an increase in loss of a TM0 polarized wave having a wavelength outside the design wavelength.

Note that the problem may arise not only in a case where a TM0 polarized wave and a TE0 polarized wave are combined together but also in a case where polarized waves of higher order are combined together. A problem similar to that described above may occur to a polarized beam combiner that combines together a TM polarized wave of any order and a TE polarized wave of any order.

The present invention has been made in view of the problems, and it is an object of the present invention that a substrate-type waveguide element, which includes a first core for receiving a TM polarized wave and a second core for outputting the TM polarized wave, is configured to (i) increase a polarization extinction ratio without increasing loss of a TM polarized wave having a wavelength outside a design wavelength or (ii) decrease, without decreasing a polarization extinction ratio, loss of a TM polarized wave having a wavelength outside a design wavelength.

Solution to Problem

A substrate-type waveguide element of the present invention includes: a lower cladding; a first core and a second core which are provided on the lower cladding; and an upper cladding provided on the lower cladding so as to bury the first core and the second core, a TM polarized wave inputted into the first core being outputted from the second core, a cross section of at least a partial segment of the first core having a step-like shape including a quadrilateral shape of a main part and a quadrilateral shape of a protruding part protruding from the main part, so that an effective refractive index of a TE polarized wave in the first core differs from an effective refractive index of a TE polarized wave in the second core.

With the configuration, it is possible to increase a polarization extinction ratio without weakening optical coupling between respective TM polarized waves guided through the two cores. In other words, it is possible to increase the polarization extinction ratio without increasing loss of a TM polarized wave having a wavelength outside a design wavelength. Alternatively, it is possible to increase, without decreasing a polarization extinction ratio, optical coupling between respective TM polarized waves guided through the two cores. In other words, it is possible to decrease, without decreasing the polarization extinction ratio, loss of a TM polarized wave having a wavelength outside a design wavelength.

Advantageous Effects of Invention

With the present invention, it is possible to (i) increase a polarization extinction ratio without increasing loss of a TM polarized wave having a wavelength outside a design wavelength or (ii) decrease, without decreasing a polarization extinction ratio, loss of a TM polarized wave having a wavelength outside a design wavelength.

DESCRIPTION OF EMBODIMENTS

The following description will discuss, with reference to the drawings, a substrate-type waveguide element in accordance with an embodiment of the present invention. Although the present embodiment will discuss a substrate-type waveguide element in which a TM0 polarized wave and a TE0 polarized wave are combined together, the scope of application of the present invention is not restricted to such a configuration. In other words, the present invention is also applicable to a substrate-type waveguide element in which a TM polarized wave of higher order and a TE polarized wave of higher order are combined together. Even in such a case, it is possible to bring about an advantageous effect similar to that produced by the substrate-type waveguide element of the present embodiment.

[Configuration of Substrate-Type Waveguide Element of the Present Embodiment]

Figure 1:
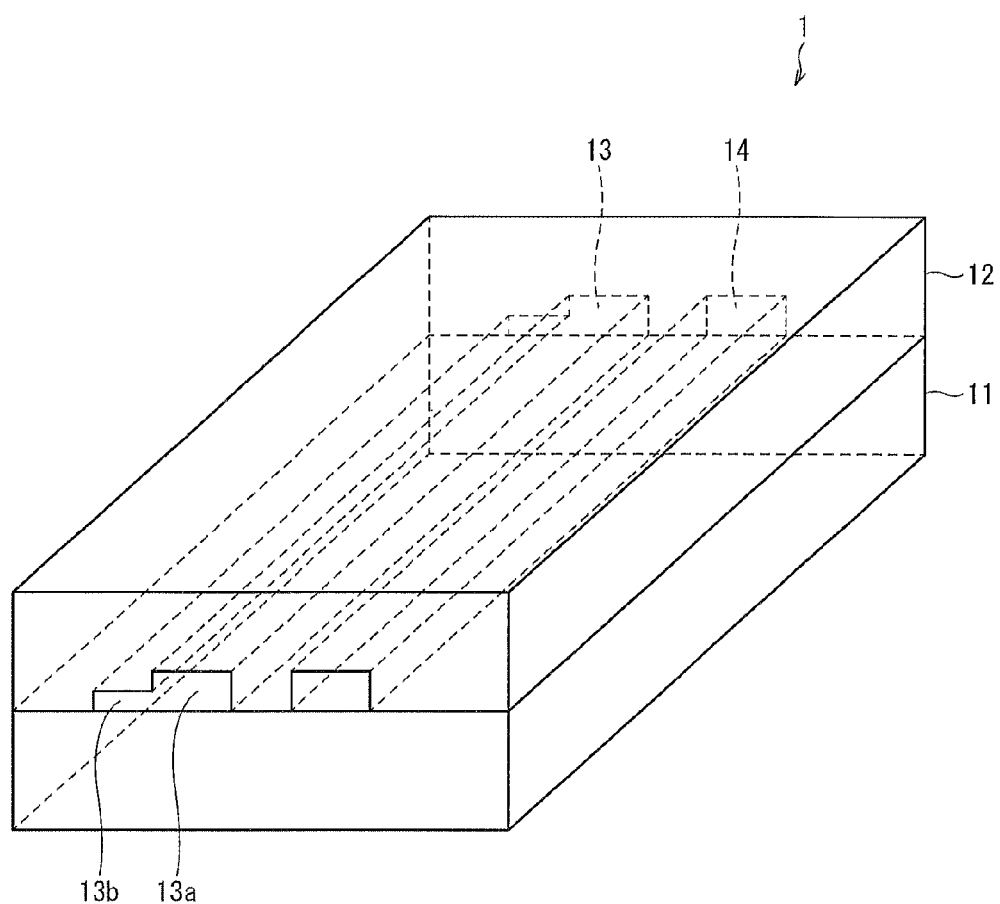
FIG. 1 is a perspective view illustrating a configuration of a substrate-type waveguide element in accordance with an embodiment of the present invention.

A configuration of a substrate-type waveguide element 1 in accordance with the present embodiment will be first described with reference to FIG. 1. FIG. 1 is a perspective view illustrating the configuration of the substrate-type waveguide element 1.

As illustrated in FIG. 1, the substrate-type waveguide element 1 includes (i) a lower cladding 11 made of silica ($SiO_2$), (ii) two cores 13 and 14, each made of silicon (Si), which are provided on the lower cladding 11, (iii) an upper cladding 12, made of silica ($SiO_2$), which is provided on the lower cladding 11 so as to bury the two cores 13 and 14. The two cores 13 and 14 are provided so that their respective side surfaces are in the proximity of each other in a segment shown in FIG. 1. Hereinafter, the segment, in which the respective side surfaces of the two cores 13 and 14 are in the proximity of each other, will be also referred to as "parallel segment."

According to the substrate-type waveguide element 1, the two cores 13 and 14 are designed so that the following conditions (1) through (3) are met within a predetermined design wavelength.

(1) Respective effective refractive indices of TM0 polarized waves in the two cores 13 and 14 match each other.

(2) A length of the parallel segment, in which the two cores 13 and 14 run parallel to each other, matches a coupling length $L_c$ (TM0) of the TM0 polarized waves.

(3) Respective effective refractive indices of TE0 polarized waves in the two cores 13 and 14 differ from each other.

By meeting Condition (1) and Condition (2), it is possible to cause an entire TM0 polarized wave, which has been inputted into the first core 13, to be outputted from the second core 14. The reason is as follows: By meeting Condition (1), "F" shown in Equation (1) becomes 1. By meeting Condition (2), "sin(qL)" shown in Equation (1) becomes 1. This causes a coupling efficiency T, which is defined by Equation (1) to be 1.

By meeting Condition (3), it is possible to restrict transfer of a TE0 polarized wave from the first core 13 to the second core 14. This allows a polarization extinction ratio to be increased without causing optical coupling between TM0 polarized waves guided through the two cores 13 and 14 to be decreased (i.e. without causing an increase in loss of a TM0 polarized wave having a wavelength outside the design wavelength). Alternatively, it is possible, without causing the polarization extinction ratio to be decreased, to cause the optical coupling between the TM0 polarized waves guided through the two cores 13 and 14 to be strong (i.e. to cause a decrease in loss of the TM0 polarized wave having a wavelength outside the design wavelength).

Note that Condition (1) is sufficiently met if the respective effective refractive indices of the two cores 13 and 14 with respect to the TM0 polarized waves match each other to such an extent that δ defined by Equation (4) is smaller than x defined by Expression (5). In addition, Condition (3) is sufficiently met if the respective effective refractive indices of the two cores 13 and 14 with respect to the TE0 polarized waves differ from each other to such an extent that δ defined by Equation (4) is larger than x defined by Expression (5).

According to the substrate-type waveguide element 1, a cross section of the first core 13 has a step-like shape so as to simultaneously meet Condition (1) and Condition (3) (see FIG. 1). Note that the "step-like shape" refers to a shape made up of (i) a main part 13a which is rectangular shaped and (ii) a protruding part 13b which (a) protrudes from the main part 13a in a direction parallel to a direction in which a boundary surface between the lower cladding 11 and the upper cladding 12 extends, (b) is lower in height than the main part 13a, and (c) is rectangular shaped.

Figure 2:
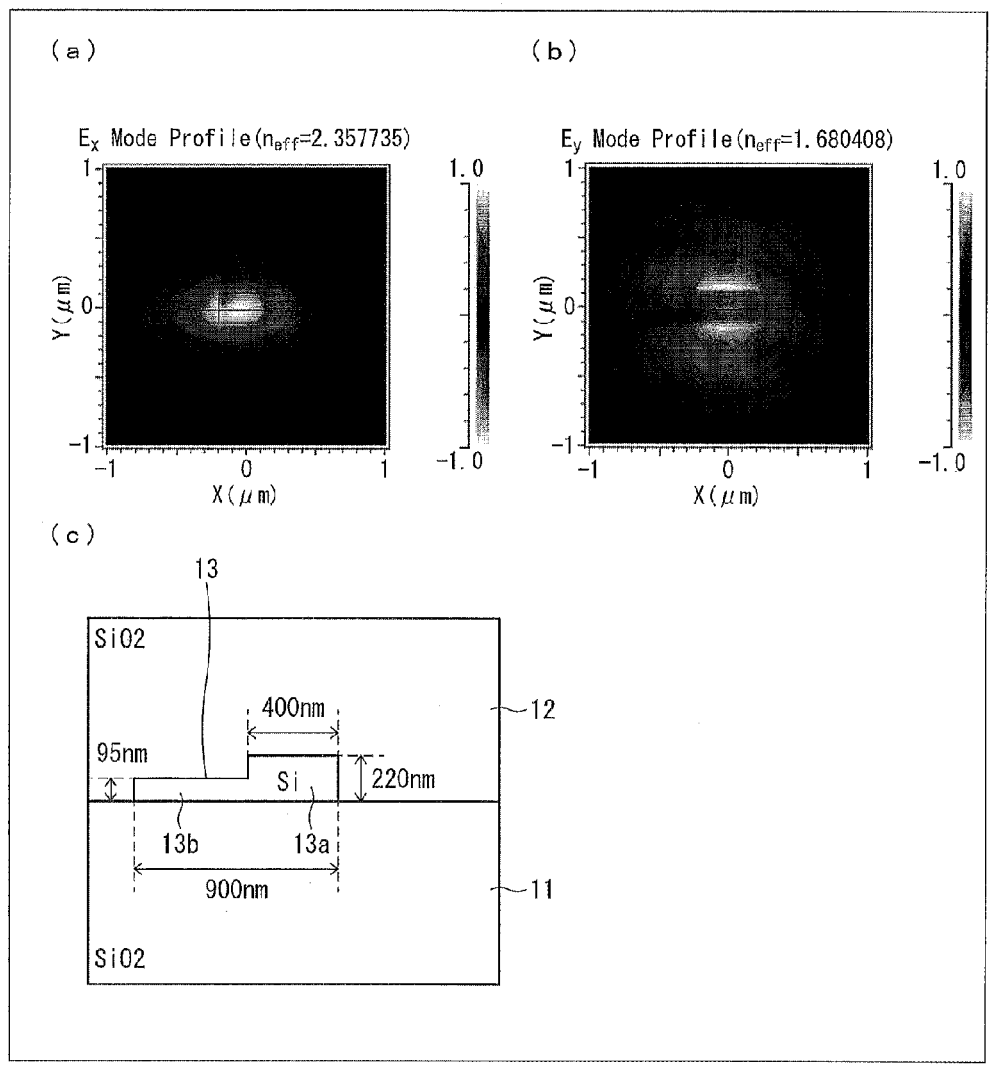
FIG. 2 is a set of views (a) through (c). (a) of FIG. 2 is a graph illustrating an electric field (Ex component) distribution of a TE0 polarized wave (wavelength: 1580 nm) guided through a first core included in the substrate-type waveguide element illustrated in FIG. 1. (b) of FIG. 2 is a graph illustrating an electric field (Ey component) distribution of a TM0 polarized wave (wavelength: 1580 nm) guided through the first core. (c) of FIG. 2 is a cross-sectional view illustrating a shape of the first core used for obtaining the electric field distributions illustrated in (a) and (b) of FIG. 2.

The reason that Condition (1) and Condition (3) are met by causing the cross section of the first core 13 to have the step-like shape will be described next with reference to FIG. 2. (a) of FIG. 2 is a graph illustrating an electric field (Ex component) distribution of a TE0 polarized wave (wavelength: 1580 nm) guided through the first core 13. (b) of FIG. 2 is a graph illustrating an electric field (Ey component) distribution of a TM0 polarized wave (wavelength: 1580 nm) guided through the first core 13. (c) of FIG. 2 is a cross-sectional view illustrating the shape of the first core 13 employed to obtain electric field distributions illustrated in (a) and (b) of FIG. 2.

With respect to the TE0 polarized wave propagating through the first core 13, the graph shown in (a) of FIG. 2 indicates that (i) an electric field, which is formed in the protruding part 13b, is strong (in comparison with an electric field with respect to the TM0 polarized wave) and (ii) an amount of the electric field escaping out of the core toward, in particular, the second core 14 is small. With respect to the TM0 polarized wave propagating through the first core 13, the graph shown in (b) of FIG. 2 indicates that (i) an electric field, which is formed in the protruding part 13b, is weak (in comparison with an electric field with respect to the TE0 polarized wave) and (ii) an amount of the electric field escaping out of the core is large.

It is noteworthy that the amount of the TE0 polarized wave escaping out of the core is significantly smaller than the amount of the TM0 polarized wave escaping out of the core, that is, force confining the TE0 polarized wave into the core is significantly greater than force confining the TM0 polarized wave into the core. This means that the first core 13 is larger in birefringence than the second core 14. Note that "birefringence" points to a difference between an effective refractive index with respect to the TE0 polarized wave and an effective refractive index with respect to the TM0 polarized wave. Note also that "large birefringence" points to a large difference between the effective refractive index with respect to the TE0 polarized wave and the effective refractive index with respect to the TM0 polarized wave.

According to the substrate-type waveguide element 1, cross-sectional shapes of the two cores 13 and 14 are designed so that Condition (1) described above is met, that is, the effective refractive indices with respect to the TM0 polarized waves match each other. In so doing, since the first core 13 is large in birefringence than the second core 14 as described above, the respective effective refractive indices of the two cores 13 and 14 with respect to the TE0 polarized waves are inevitably different from each other. In other words, Condition (3) is met.

The cross-sectional shapes of the two cores 13 and 14 can be, for example, designed as follows: (i) The cross-sectional shape of the first core 13 is appropriately determined, (ii) an effective refractive index of a TM0 polarized wave in the first core 13 is calculated, (iii) a height of the second core 14 is determined so as to match a height of the first core 13, and then, while an effective refractive index of a TM0 polarized wave in the second core 14 is calculated, a width of the second core 14 is changed until the respective effective refractive indices of the TM0 polarized waves in the two cores 13 and 14 match each other; the width of the second core 14 is thus determined. In a case where the two cores 13 and 14 are thus designed, a height of the main part 13a of the first core 13 and the height of the second core 14 match each other. This makes it possible to minimize the number of times etching needs to be carried out while the substrate-type waveguide element 1 is being produced.

[Additional Remarks]

Examples of a method for increasing the polarization extinction ratio of the conventional substrate-type waveguide element 5 by use of a single-stage directional coupler encompass (i) a method in which the widths of the cores 53 and 54 are widened and (ii) a method in which the space between the cores 53 and 54 is enlarged. Of these methods, the method in which the widths of the cores 53 and 54 are widened is relevant to the substrate-type waveguide element 1, and will therefore be discussed below for comparison. The method in which the space between the cores 53 and 54 is enlarged can be employed by use of a typical directional coupler, and will therefore not be discussed below.

The following description will explain the reason that the polarization extinction ratio can be increased by widening the widths of the cores 53 and 54. Main component of an electric field of TE0 is an electric field (Ex) of a width direction (x direction). Main component of an electric field of TM0 is an electric field (Ey) of a height direction (y direction). Generally, a larger core tends to result in greater force confining light (electric field). In a case where the widths of the cores 53 and 54 are widened, an amount by which force confining the electric field of the TE0 becomes greater is more significant than an amount by which force confining the electric field of the TM0 becomes greater. This can be explained by boundary conditions which an electric field should meet at a core-cladding boundary. Based on Maxwell equations, the boundary conditions, which electric fields at side surfaces (both lateral boundaries) of the cores should meet, are as shown in the following Equation (9) and Equation (10):

[Equation 9]

$$E_x^{cl}\left(\begin{array}{c}\text{side}\\\text{surface}\end{array}\right) = \left(\frac{N_{co}}{N_{cl}}\right)^2 E_x^{co}\left(\begin{array}{c}\text{side}\\\text{surface}\end{array}\right) \quad (9)$$

[Equation 10]

$$E_y^{cl}\left(\begin{array}{c}\text{side}\\\text{surface}\end{array}\right) = E_y^{co}\left(\begin{array}{c}\text{side}\\\text{surface}\end{array}\right) \quad (10)$$

where (i) $E_x^{cl}$ (side surface) represents cladding-side Ex at each of the lateral boundaries, (ii) $E_x^{co}$ (side surface) represents core-side Ex at each of the lateral boundaries, (iii) $E_y^{cl}$ (side surface) represents cladding-side Ey at each of the lateral boundaries, (iv) $E_y^{co}$ (side surface) represents core-side Ey at each of the lateral boundaries, (v) $N_{co}$ represents a refractive index of a core, and (vi) $N_{cl}$ represents a refractive index of a cladding.

Equation (9) mainly concerns a TE0, and Equation (10) mainly concerns TM0. Since $N_{co} > N_{cl}$ as indicated in Equation (9), Ex at each of the lateral boundaries of the cores 53 and 54 are discontinuous. Since $E_x^{cl}$ (side surface) > $E_x^{co}$ (side surface), electric fields are mainly distributed toward claddings. Therefore, in a case where the widths of the cores 53 and 54 are widened, Ex distributed outside the cores 53 and 54 are then distributed inside the cores 53 and 54. In other words, force confining the electric fields into the cores 53 and 54 becomes strong. Meanwhile, as indicated in Equation (10), Ey at each of the lateral boundaries of the cores 53 and 54 are continuous. This prevents the Ey component from changing as much as the Ex component as a result of the change in the widths of the cores 53 and 54. Thus, in the case where the widths of the cores 53 and 54 are widened, force confining TE0 (whose main electric field is Ex) into the cores is greater than force confining TM0 (whose main electric field is Ey) into the cores. As a result, an amount of a decrease in the coupling coefficient x of the TE0 is larger than an amount of a decrease in the coupling coefficient x of the TM0. This causes the polarization extinction ratio to be increased. However, the method described above also causes the coupling coefficient x of the TM0 to be decreased, and therefore makes it impossible to maintain small loss of TM polarized waves across a wide range of wavelengths.

Under such circumstances, the substrate-type waveguide element 1 solved the problem by employing asymmetric directional coupling of the cores 13 and 14. The first core 13 is larger in birefringence than the second core 14. That is, a difference between the effective refractive index of TE0 in the first core 13 and the effective refractive index of TM0 in the first core 13 is greater than a difference between the effective refractive index of TE0 in the second core 14 and the effective refractive index of TM0 in the second core 14. This is due to the following reason: First, confinement in the height direction will be described below. Based on Maxwell equations, which electric fields at upper and lower boundaries of the cores 13 and 14 should meet, are as shown in the following Equation (11) and Equation (12):

[Equation 11]
$$E_x^{cl}\begin{pmatrix} \text{upper} \\ \text{or} \\ \text{lower} \\ \text{surface} \end{pmatrix} = E_x^{co}\begin{pmatrix} \text{upper} \\ \text{or} \\ \text{lower} \\ \text{surface} \end{pmatrix} \quad (11)$$

[Equation 12]
$$E_y^{cl}\begin{pmatrix} \text{upper} \\ \text{or} \\ \text{lower} \\ \text{surface} \end{pmatrix} = \left(\frac{N_{co}}{N_{cl}}\right)^2 E_y^{co}\begin{pmatrix} \text{upper} \\ \text{or} \\ \text{lower} \\ \text{surface} \end{pmatrix} \quad (12)$$

where (i) $E_x^{cl}$ (upper or lower surface) represents cladding-side Ex at each of the upper and lower boundaries, (ii) $E_x^{co}$ (upper or lower surface) represents core-side Ex at each of the upper and lower boundaries, (iii) $E_y^{cl}$ (upper or lower surface) represents cladding-side Ey at each of the upper and lower boundaries, and (iv) $E_y^{co}$ (upper or lower surface) represents core-side Ey at each of the upper and lower boundaries.

At each of the upper and lower boundaries of the cores 13 and 14, Ey is discontinuous whereas Ex is continuous, as opposed to the Ey and Ex at each of the lateral boundaries of the cores 13 and 14. Therefore, in a case where heights of the cores 13 and 14 are made low, force confining TM0 (whose main electric field is Ey) into the cores is less than force confining TE0 (whose main electric field is Ex) into the cores. Therefore, by widening only a width of a first stage of the core 13, it is possible to increase the TE0-confining force without causing as much an increase in the TM0-confining force as does if a width of the entire core 13 is widened.

[Secondary Effects and Modifications]

The substrate-type waveguide element 1 of the present embodiment brings about the following secondary effects in addition to the effects described above.

(1) The height (thickness) of the protruding part 13*b* of the first core 13 only needs to be lower (thinner) than the height (thickness) of the main part 13*a* of the first core 13. Therefore, in a case where, for example, the substrate-type waveguide element 1 is configured as a part of a silicon optical modulator including a rib-type phase modulator, it is possible to match the height of the protruding part 13*b* to a height of the rib-type phase modulator. In such a case, it is possible to form the protruding part 13*b* and a rib of the rib-type phase modulator all together. This allows production of the silicon optical modulator to be easy.

(2) The substrate-type waveguide element 1 is resistant to production error in the width direction (direction parallel to a direction in which the boundary surface between the lower cladding 11 and the upper cladding 12 extends). This is because the production error in the width direction has a small effect on confinement of a TM0 polarized wave (having an electric field whose main component is that of the height direction). Examples of the production error in the width direction encompass (i) variance in the width of the core, (ii) variance in positions of masks used in respective two times of etching carried out in producing the core having a step-like form, and (iii) inclination of the core during the etching.

According to the present embodiment, the cross section of the first core 13 has a step-like shape such that the protruding part 13*b* protrudes away from the second core 14. However, the present invention is not limited to such a configuration. In fact, the cross section of the first core 13 can have a step-like shape such that the protruding part 13*b* protrudes toward the second core 14. Even in such a case, the first core 13 would be larger in birefringence than the second core 14, so that Condition (1) and Condition (3) described above would be simultaneously met. Note, however, that the cross section, by which the protruding part 13*b* protrudes away from the second core 14, more effectively restricts the transfer of a TE0 polarized wave from the first core 13 to the second core 14. This is because of the following reason: When a TE0 polarized wave escapes from the first core 13, a large proportion escapes in the vicinity of the protruding part 13*b*. Therefore, in the case where the cross section of the first core 13 has a step-like shape such that the protruding part 13*b* protrudes away from the second core 14, optical coupling between respective TE0 polarized waves guided through the two cores 13 and 14 is weak.

According to the present embodiment, the cross section of the first core 13 has a step-like shape (L-shape) such that the protruding part 13*b* protrudes from a lower part of the main part 13*a*. However, the present invention is not limited to such a configuration. In fact, the cross section of the first core 13 can have (i) a step-like shape (L-shape upside down) such that the protruding part 13*b* protrudes from an upper part of the main part 13*a* or (ii) a step-like shape (T-shape) such that the protruding part 13*b* protrudes from a middle part (between the upper part and the lower part) of the main part 13*a*. Even in such cases, the first core 13 would be larger in birefringence than the second core 14, so that Condition (1) and Condition (3) described above would be simultaneously met. Note, however, that the cross section, by which the protruding part 13*b* protrudes from the lower part of the main part 13*a*, allows production of the substrate-type waveguide element 1 to be easier. This is because, in the case where the cross section of the first core 13 has a step-like shape such that the protruding part 13b protrudes from the lower part of the main part 13a, the first core 13 can be formed by two times of etching.

According to the present embodiment, the cross section of the first core 13 and the cross section of the second core 14 have a step-like shape and a quadrilateral shape, respectively. However, the present invention is not limited to such a configuration. In fact, the respective cross sections of the two cores 13 and 14 can each have a step-like shape, provided that the respective cross sections of the two cores 13 and 14 are asymmetric. Even in such a case, the first core 13 would be larger in birefringence than the second core 14, so that Condition (1) and Condition (3) described above would be simultaneously met. Note, however, that in the case where the cross section of the first core 13 and the cross section of the second core 14 have a step-like shape and a quadrilateral shape, respectively, it is possible to more effectively restrict the transfer of a TE0 polarized wave from the first core 13 to the second core 14. This is because, in the case where the cross section of the first core 13 and the cross section of the second core 14 have a step-like shape and a quadrilateral shape, respectively, the difference in effective refractive index of TE0 polarized wave between the two cores 13 and 14 is greater.

According to the present embodiment, the first core 13 and the second core 14 are provide side by side. However, the present invention is not limited to such a configuration. In fact, the first core 13 can be provided on top of the second core 14, or vice versa. Even in such a case, the first core 13 would have birefringence, so that Condition (1) and Condition (3) described above would be simultaneously met. Note, however, that in the case where the first core 13 and the second core 14 are provided side by side, the production of the substrate-type waveguide element 1 is easier. This is because, in the case where the first core 13 and the second core 14 are provide side by side, the first core 13 and the second core 14 can be simultaneously formed by etching.

According to the present embodiment, the respective cross sections of the main part 13a, the protruding part 13b, and the second core 14 each have a rectangular shape. However, the present invention is not limited to such a configuration. In fact, it is only necessary that the respective cross sections of the main part 13a, the protruding part 13b, and the second core 14 each have a trapezoidal shape or any other quadrilateral shape. Note that "quadrilateral shape" herein stated only needs to be a shape that can be considered a quadrilateral shape when viewed macroscopically, and can have bending sides or round edges when viewed microscopically.

Example

Figure 3:
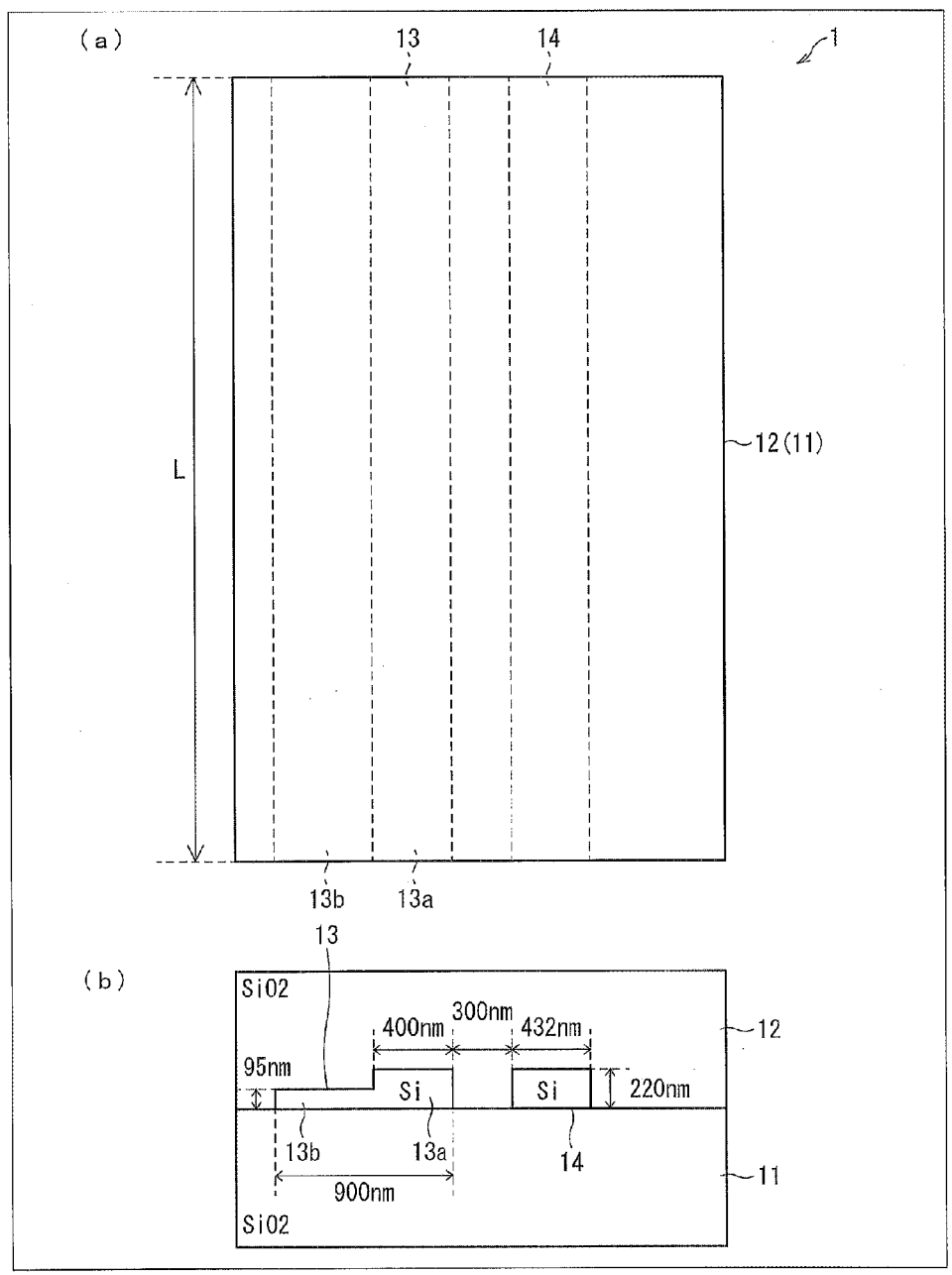
FIG. 3 is a set of views (a) and (b). (a) of FIG. 3 is a plan view of a substrate-type waveguide element in accordance with an example. (b) of FIG. 3 is a cross-sectional view of the substrate-type waveguide element.
Figure 4:
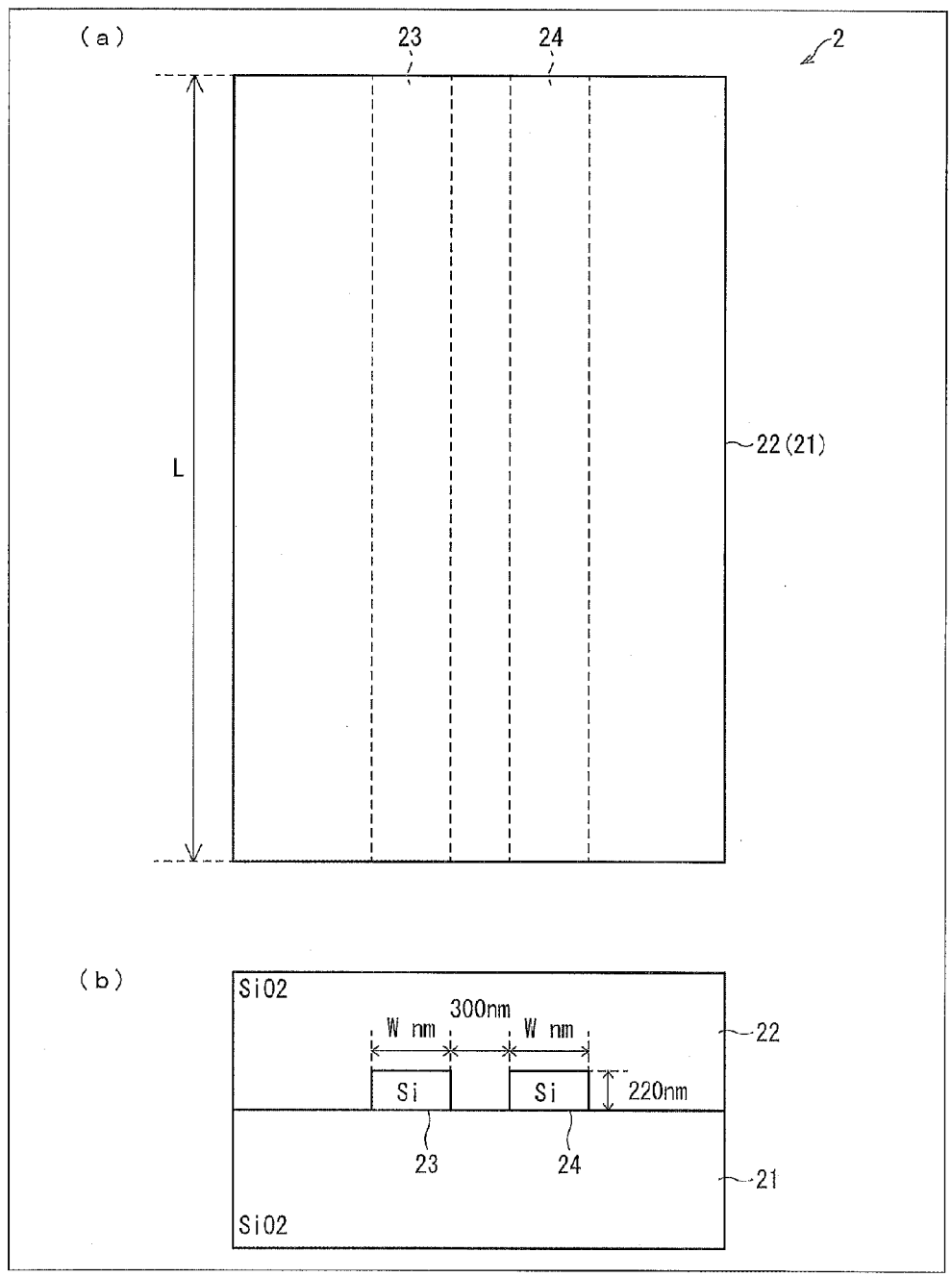
FIG. 4 is a set of views (a) and (b). (a) of FIG. 4 is a plan view of a substrate-type waveguide element in accordance with a comparative example. (b) of FIG. 4 is a cross-sectional view of the substrate-type waveguide element.
Figure 5:
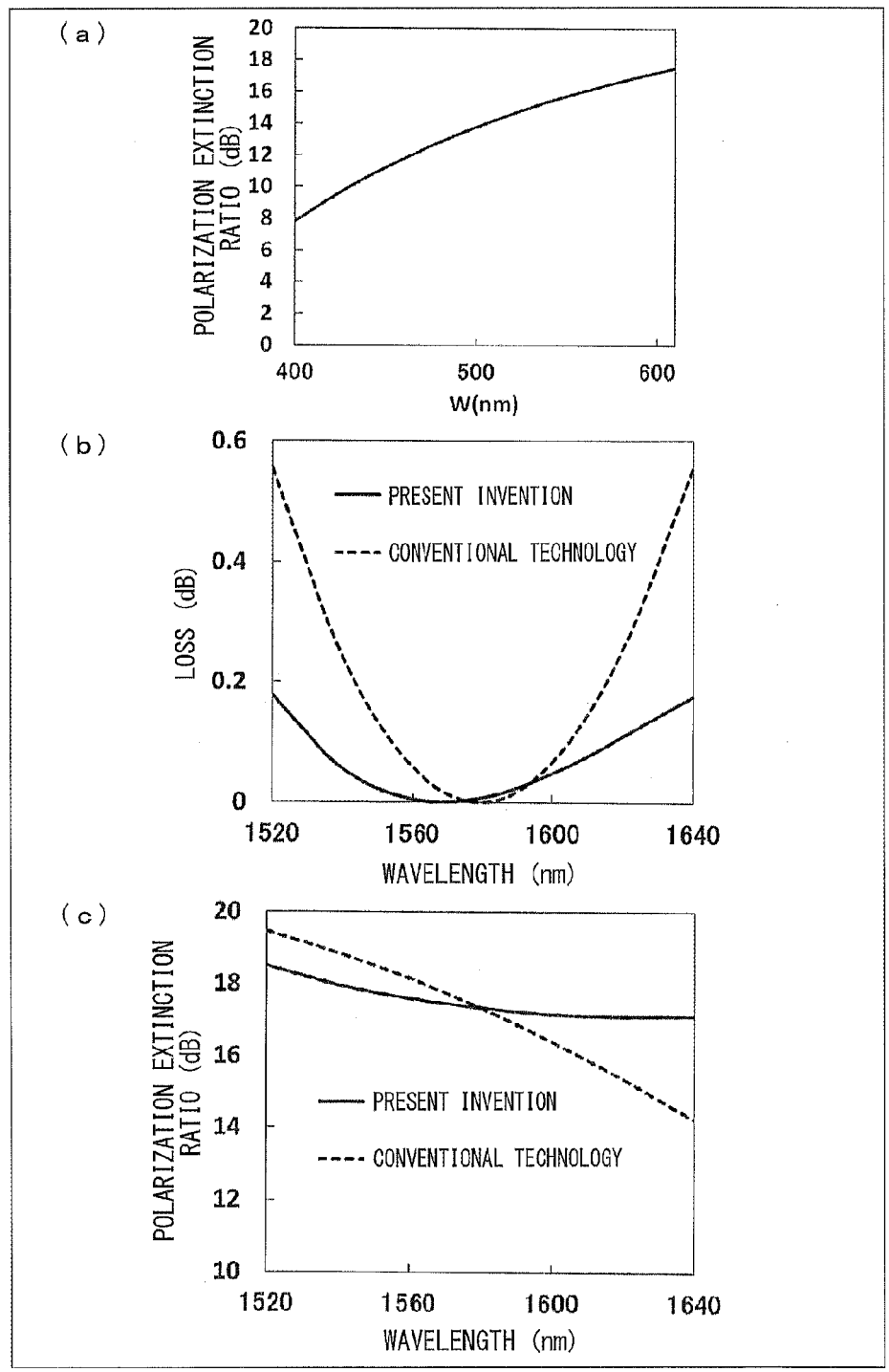
FIG. 5 is a set of views (a), (b), and (c). (a) of FIG. 5 is a graph obtained by calculating a polarization extinction ratio of the substrate-type waveguide element (of the comparative example) illustrated in FIG. 4. (b) of FIG. 5 is a graph obtained by calculating, while changing wavelengths of TM0 polarized waves being inputted, loss (−10×log 10 (coupling efficiency)) of the respective TM0 polarized waves in the substrate-type waveguide element (of the example) illustrated in FIG. 3 and in the substrate-type waveguide element (of comparative example) illustrated in FIG. 4. (c) of FIG. 5 is a graph obtained by calculating respective polarization extinction ratios in the substrate-type waveguide element (of the example) illustrated in FIG. 3 and in the substrate-type waveguide element (of the comparative example) illustrated in FIG. 4 while wavelengths of TM0 polarized waves and TE0 polarized waves inputted were being changed.

The following description will discuss, with reference to FIGS. 3 through 5, an example of the substrate-type waveguide element 1 in accordance with the present embodiment.

(a) of FIG. 3 is a plan view of a substrate-type waveguide element 1 in accordance with the example. (b) of FIG. 3 is a cross-sectional view of the substrate-type waveguide element 1.

In the present example, cross-sectional shapes of two cores 13 and 14 included in the substrate-type waveguide element 1 were designed in the following steps. First, the cross-sectional shape of the first core 13 was determined to be a step-like shape as illustrated in (b) of FIG. 3. Then, an effective refractive index N1 of a TM0 polarized wave, which had a wavelength of 1580 nm and which was guided through the first core 13, was calculated, and was determined to be 1.68041. Then, a height of the second core 14 was configured to be 220 nm (which is equal to a height of a main part 13a of the first core 13). Then, an effective refractive index N2 of a TM0 polarized wave, which had a wavelength of 1580 nm and which was guided through the second core 14, was calculated while the height of the second core 14 was being changed. Then, a width of 432 nm, was obtained as a width of the second core 14 when the effective refractive index N2 thus calculated is close to 1.68041 which is the effective refractive index N1 of the first core 13 (i.e. when the effective refractive index N2 thus calculated does not fall outside a predetermined error range). Note that a length L of the parallel segment, in which the two cores 13 and 14 run parallel to each other, was made to match a coupling length $L_c$ with respect to the TM0 polarized wave having a wavelength of 1580 nm.

Note that the substrate-type waveguide element 1 in accordance with the present example can be produced, for example, as follows: First, an SOI (Silicon on insulator) substrate, which is obtained by sandwiching a silica (SiO2) layer with two silicon (Si) layers, is prepared (the silica layer in the middle is to be used as a lower cladding 11, and an upper silicon layer is to be used as two cores 13 and 14). Then, the upper silicon layer of the SOI substrate is subjected to etching twice, thereby forming the two cores 13 and 14. Then, another silica layer is provided on the lower cladding 11 so as to bury the two cores 13 and 14, and said another silica layer is designated as an upper cladding 12.

The substrate-type waveguide element 1 thus designed and produced revealed, as shown in the table below, the following results with respect to a TE0 polarized wave and a TM0 polarized wave: (1) an effective refractive index N1 of each of target modes in the first core 13, (2) an effective refractive index N2 of each of target modes in the second core 14, (3) a difference $\Delta N_1$ in effective refractive index (=|N1−N2|), (4) δ $(=(\pi/\lambda) \times \Delta N_1)$, and (5) a coupling coefficient x.

TABLE 1

|  | Step-like core | Rectangular Core | Effective refractive index (absolute value) | δ (absolute value) (rad/um) | Coupling coefficient χ (rad/um) |
| --- | --- | --- | --- | --- | --- |
| TE0 | 2.35774 | 2.26732 | 0.09042 | 0.1798 | 0.0247 |
| TM0 | 1.68041 | 1.68071 | 0.00030 | 0.0006 | 0.1934 |

The above table confirms that (i) the respective effective refractive indices of the TM0 polarized waves in the two cores 13 and 14 sufficiently match each other (i.e. δ<x) and (ii) the respective effective refractive indices of the TE0 polarized waves in the two cores 13 and 14 sufficiently differ from each other (δ>x). In other words, the above table confirms that it is possible to restrict transfer of a TE0 polarized wave from the first core 13 to the second core 14 without interfering with transfer of a TM0 polarized wave from the first core 13 to the second core 14.

Note that a polarization extinction ratio of the substrate-type waveguide element 1 of the present example while on a wavelength of 1580 nm was 17.3 dB.

(a) of FIG. 4 is a plan view of a substrate-type waveguide element 2 in accordance with a comparative example. (b) of FIG. 4 is a cross-sectional view of the substrate-type waveguide element 2.

The substrate-type waveguide element 2 in accordance with the present comparative example includes (i) a lower cladding 21 made of silicon, (ii) two cores 23 and 24, made of silica, which are provided on the lower cladding 21, and (iii) an upper cladding 22, made of silicon, which is provided on the lower cladding 21 so as to bury the two cores 23 and 24. The two cores 23 and 24 have congruent rectangular cross sections.

In the present comparative example, cross-sectional shapes of the two cores 23 and 24 included in the substrate-type waveguide element 2 were designed in the following steps. First, heights of the two cores 23 and 24 were configured to be 220 nm which is equal to the heights of the two cores 13 and 14 included in the substrate-type waveguide element 1 of in accordance with the present example. A space between the two cores 23 and 24 was configured to be 300 nm which is equal to a space between the two cores 13 and 14 included in the substrate-type waveguide element 1 in accordance with the present example. Then, a polarization extinction ratio on a wavelength of 1580 nm was calculated while a width W of each of the two cores 23 and 24 was changed, and was obtained as shown in (a) of FIG. 5. Note that in calculating the polarization extinction ratio with respect to the width W, a length L of the parallel segment, in which the two cores 23 and 24 run parallel to each other, was made to match a coupling length $L_c$ of a TM0 polarized wave, which coupling length $L_c$ is determined according to the width W. The graph shown in (a) of FIG. 5 indicates that, in a case where the width W of each of the two cores 23 and 24 is configured to be 604 nm, the polarization extinction ratio is 17.3 dB which is equal to that of the substrate-type waveguide element 1 in accordance with the present example. The width W of each of the two cores 23 and 24 was therefore determined to be 604 nm.

(b) of FIG. 5 is a graph obtained by calculating, while changing wavelengths of TM0 polarized waves being inputted, loss (−10×log 10 (coupling efficiency)) of the respective TM0 polarized waves in the substrate-type waveguide element 1 of the present example and in the substrate-type waveguide element 2 of the present comparative example. In (b) of FIG. 5, (i) a graph drawn by a solid line with the indication "present invention" corresponds to the substrate-type waveguide element 1 of the present example and (ii) a graph drawn by a dotted line with the indication "conventional technology" corresponds to the substrate-type waveguide element 2 of the present comparative example.

(b) of FIG. 5 confirms that, in a design wavelength (1580 nm) and a peripheral band (1520 nm to 1640 nm), the substrate-type waveguide element 1 of the present example is smaller in loss of TM0 polarized wave than the substrate-type waveguide element 2 of the present comparative example. Specifically, a maximum loss of the TM0 polarized wave in the peripheral band of the substrate-type waveguide element 2 of the present comparative example reaches 0.56 dB whereas a maximum loss of the TM0 polarized wave in the peripheral band of the substrate-type waveguide element 1 is limited to 0.18 dB. This confirms that, with the substrate-type waveguide element 1 of the present example, it is possible to restrict, to a small amount, an increase in loss of a TM0 polarized wave inputted, which loss occurs when the TM0 polarized wave falls outside a design wavelength.

(c) of FIG. 5 is a graph obtained by calculating respective polarization extinction ratios in the substrate-type waveguide element 1 of the present example and in the substrate-type waveguide element 2 of the present comparative example while wavelengths of TM0 polarized waves and TE0 polarized waves inputted were being changed. In (c) of FIG. 5, (i) a graph drawn by a solid line with the indication "present invention" corresponds to the substrate-type waveguide element 1 of the present example and (ii) a graph drawn by a dotted line with the indication "conventional technology" corresponds to the substrate-type waveguide element 2 of the present comparative example.

(c) of FIG. 5 confirms that the substrate-type waveguide element 1 of the present example is higher in polarization extinction ratio than the substrate-type waveguide element 2 of the comparative example in a part of a peripheral band (1580 nm to 1640 nm) where a wavelength is longer than a design wavelength (1580 nm). Specifically, a minimum polarization extinction ratio in the peripheral band of the substrate-type waveguide element 2 reaches 14.2 dB whereas a minimum polarization extinction ratio in the peripheral band of the substrate-type waveguide element 1 is limited to 17.2 dB. In other words, (c) of FIG. 5 confirms that, with the substrate-type waveguide element 1 of the present example, it is possible to restrict, to a small amount, an decrease in polarization extinction ratio, which decrease occurs when wavelengths of a TM0 polarized wave inputted and a TE0 polarized wave inputted fall in a part where a wavelength is longer than the design wavelength. In a case where, in particular, a value of a polarization extinction ratio in a particular wavelength range is to be ensured, a minimum polarization extinction ratio in the wavelength range is to determine overall performance. It is clear in this viewpoint that the present invention is higher (not lower) in polarization extinction ratio than the conventional technology in the peripheral band (1520 nm to 1640 nm).

Modification 1

According to the substrate-type waveguide element 1 illustrated in FIG. 1, cores 13 and 14 each having a straight form (straight waveguides) are provided. However, the present invention is not limited to such a configuration. In fact, a configuration, in which curved cores 13 and 14 (curved waveguide) are provided, is also encompassed in the scope of the present invention.

Figure 6:
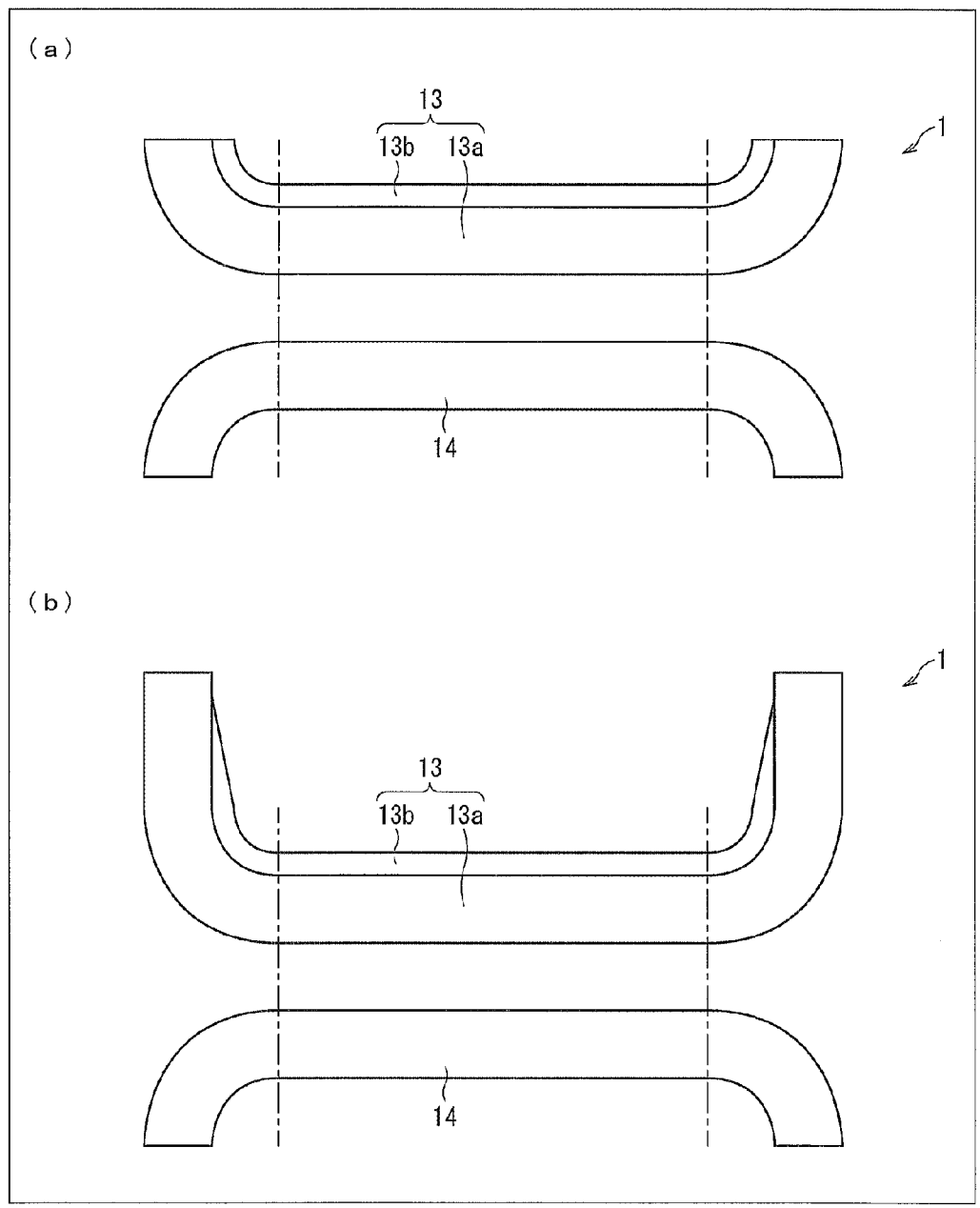
FIG. 6 is a set of views (a) and (b). (a) of FIG. 6 is a plan view illustrating Modification 1 of the substrate-type waveguide element illustrated in FIG. 1. (b) of FIG. 6 is a plan view illustrating Modification 2 of the substrate-type waveguide element illustrated in FIG. 1.

An example of such a substrate-type waveguide element 1 is shown in (a) of FIG. 6. (a) of FIG. 6 is a plan view of the substrate-type waveguide element 1 in accordance with the present modification.

According to the present substrate-type waveguide element 1 of Modification 1, an approaching segment and a distancing segment, in which curved parts of the cores 13 and fall, are provided at an input-terminal side and an output-terminal side, respectively, of a parallel segment in which straight parts of the two cores 13 and 14 fall. In the approaching segment, a shorter distance between the two cores 13 and 14 is relative to a further distance from input terminals. In the distancing segment, a longer distance between the two cores 13 and 14 is relative to a closer distance to output terminals.

By thus configuring the two cores 13 and 14 to gradually approach to/distance from each other, it is possible to restrict reflection that may occur at the input/output terminals of the two cores 13 and 14.

Note that, according to Modification 1, the core 13 is bent at two parts which are the input-terminal side and the output-terminal side of the first core 13, and the core 14 is bent at two parts which are the input-terminal side and the output-terminal side of the second core 14. However, the present invention is not limited to such a configuration. That is, the core 13 can bent at the input-terminal side and/or the output-terminal side of the first core 13, and/or the core 14 can bent at the input-terminal side and/or the output-terminal side of the second core 14.

Modification 2

According to the substrate-type waveguide element 1 illustrated in FIG. 1, the width of the protruding part 13*b* of the first core 13 is constant (i.e. the width extending in a direction which is (i) orthogonal to a traveling direction in which light propagates in the core 13 and (ii) parallel to a direction in which the boundary surface between the lower cladding 11 and the upper cladding 12 extends). However, the present invention is not limited to such a configuration. In fact, a configuration, in which the width of the protruding part 13*b* of the first core 13 changes, is also encompassed in the scope of the present invention.

An example of such a substrate-type waveguide element 1 is shown in (b) of FIG. 6. (b) of FIG. 6 is a plan view of a substrate-type waveguide element 1 in accordance with Modification 2.

As is the case of the substrate-type waveguide element 1 illustrated in (a) of FIG. 6, the substrate-type waveguide element 1 of Modification 2 is configured such that a curved approaching segment and a curved distancing segment of the cores 13 and 14 are provided at an input-terminal side and an output-terminal side, respectively, of a straight parallel segment of the cores 13 and 14. Note, however, the protruding part 13*b* has a tapering form as follows: (i) the approaching segment is configured such that a wider width of a protruding part 13*b* of a first core 13 is relative to a further distance from an input terminal and (ii) the distancing segment is configured such that a narrower width of the protruding part 13*b* of the first core 13 is relative to a closer distance to an output terminal.

By thus configuring the width of the protruding part 13*b* of the first core 13 to gradually change, it is possible to restrict, to a small amount, loss that may occur in a case where the first core 13 is to be connected to an external waveguide.

According to Modification 2, a height of the first core 13 is constant (i.e. the height extending in a direction which is (i) orthogonal to a traveling direction in which light propagates in the core 13 and (ii) perpendicular to a direction in which the boundary surface between the lower cladding 11 and the upper cladding 12 extends). However, the present invention is not limited to such a configuration. In fact, for example, (i) the approaching segment can be configured such that a higher height of the protruding part 13*b* is relative to a further distance from the input terminal and (ii) the distancing segment can be configured such that a lower height of the protruding part 13*b* is relative to a closer distance to the output terminal.

Modification 3

According to the substrate-type waveguide element 1 illustrated in FIG. 1, (i) the cross section of the first core 13 has a step-like shape for the entirety segment and (ii) the cross section of the second core 14 has a quadrilateral shape for the entire segment. However, the present invention is not limited to such a configuration. For example, a configuration, in which the first core 13 and the second core 14 each have a segment in which the cross section has a step-like shape and a segment in which the cross section has a quadrilateral shape, is also encompassed in the scope of the present invention.

Figure 7:
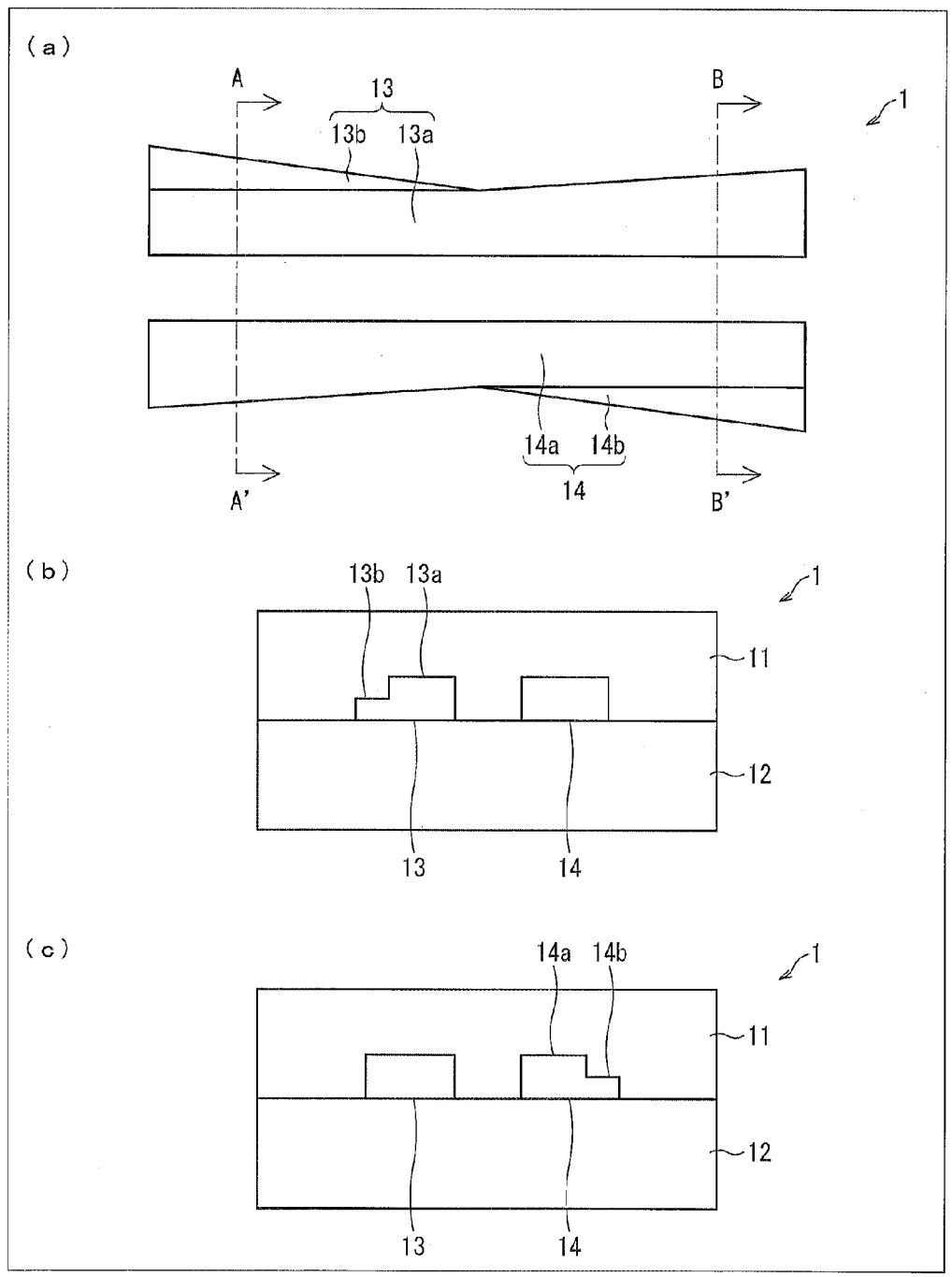
FIG. 7 is a set of views (a) and (b). (a) of FIG. 7 is a plan view illustrating Modification 3 of the substrate-type waveguide element illustrated in FIG. 1. (b) of FIG. 7 is a cross-sectional view taken along the line A-A' shown in (a) of FIG. 7. (c) of FIG. 7 is a cross-sectional view taken along the line B-B' shown in (a) of FIG. 7.

An example of such a substrate-type waveguide element 1 is shown in FIG. 7. (a) of FIG. 7 is a plan view of a substrate-type waveguide element 1 in accordance with Modification 3. (b) of FIG. 7 is a cross-sectional view taken along the line A-A' shown in (a) of FIG. 7. (c) of FIG. 7 is a cross-sectional view taken along the line B-B' shown in (a) of FIG. 7.

An input-terminal-side half of a segment is configured such that a cross section of the first core 13 has a step-like shape whereas a cross section of the second core 14 has a quadrilateral shape (see (b) of FIG. 7). On the other hand, an output-terminal-side half of the segment is configured such that the cross section of the first core 13 has a quadrilateral shape whereas the cross section of the second core 14 has a step-like shape (see (c) of FIG. 7).

The input-terminal-side half of the segment is also configured such that (i) a narrower width of a protruding part 13*b* of the first core 13 is relative to a further distance from an input terminal of the first core 13 and (ii) a narrower width of the second core 14 is relative to a further distance from an input terminal of the second core 14 (see (a) of FIG. 7). On the other hand, the output-terminal-side half of the segment is also configured such that (i) a wider width of a protruding part 14*b* of the second core 14 is relative to a closer distance to an output terminal of the second core 14 and (ii) a wider width of the first core 13 is relative to a closer distance to an output terminal of the first core 13 (see (a) of FIG. 7).

According to the substrate-type waveguide element 1 of Modification 3, a structure of the input terminals of the two cores 13 and 14 is identical to a structure of a previous waveguide which is provided immediately before the substrate-type waveguide element 1. This makes it unnecessary to provide, between the substrate-type waveguide element 1 and the previous waveguide, a converter for matching the structure of the input terminals of the two cores 13 and 14 to the structure of the previous waveguide. In addition, according to the substrate-type waveguide element 1 of Modification 3, the structure of the output terminals of the two cores 13 and 14 is identical a structure of a following waveguide which is provided immediately after the substrate-type waveguide element 1. This makes it unnecessary to provide, between the substrate-type waveguide element 1 and the following waveguide, a converter for matching the structure of the output terminals of the two cores 13 and 14 to the structure of the following waveguide. Therefore, it is possible to shorten the device length of an optical device including the substrate-type waveguide element 1 of Modification 3.

[Optical Modulator]

Figure 8:
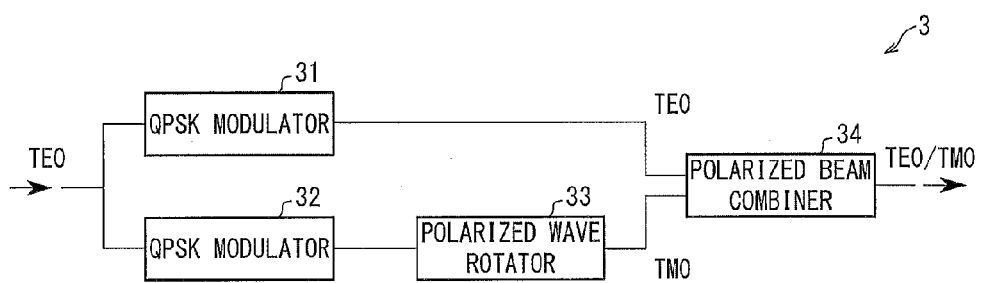
FIG. 8 is a block diagram illustrating a configuration of an optical modulator including the substrate-type waveguide element illustrated in FIG. 1.
Figure 9:
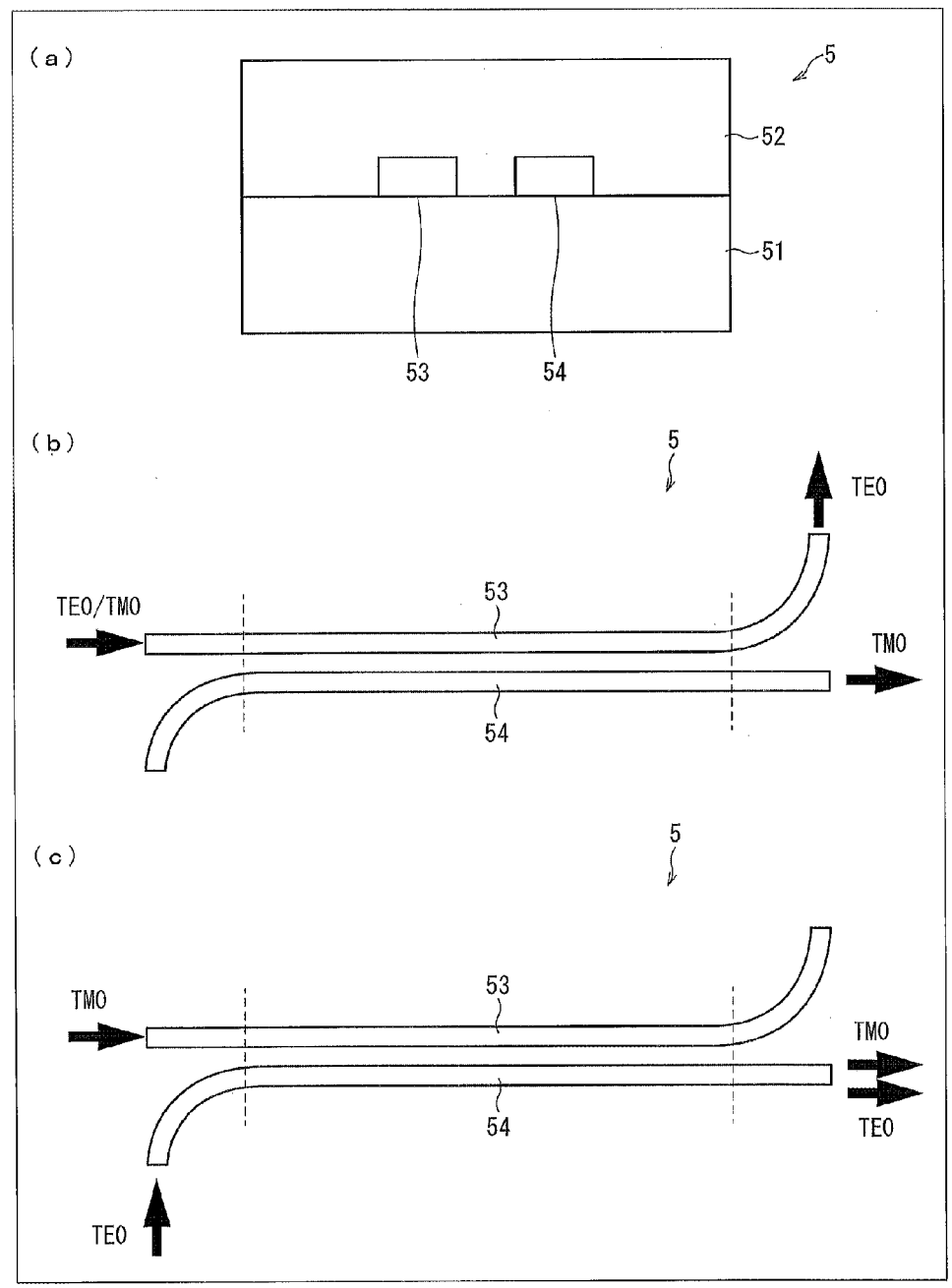
FIG. 9 is a set of views (a), (b), and (c). (a) of FIG. 9 is a cross-sectional view of a conventional substrate-type waveguide element. (b) and (c) of FIG. 9 are each a plan view of the conventional substrate-type waveguide element.
Figure 10:
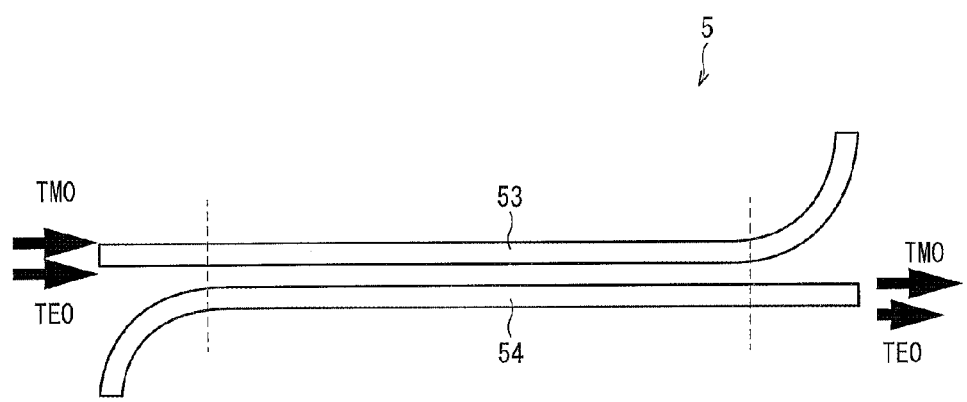
FIG. 10 is a plan view of the substrate-type waveguide element illustrated in FIG. 9.

The following description will discuss, with reference to FIG. 8, an optical modulator 3 which includes, as a polarized beam combiner, the substrate-type waveguide element 1 in accordance with the present embodiment. FIG. 8 is a block diagram illustrating a configuration of such an optical modulator 3.

The optical modulator 3 is a DP-QPSK (Dual Polarization-Quadrature Phase Shift Keying) modulator. As illustrated in FIG. 8, the optical modulator 3 includes (1) two QPSK modulator 31 and 32 which carry out QPSK modulation of TE0 polarized waves, (2) a polarized wave rotator 33 which converts, into a TM0 polarized wave, the TE0 polarized wave that has been modulated by the second QPSK modulator 32, and (3) a polarized beam combiner 34 which combines together (i) the TE0 polarized wave that has been modulated by the first QPSK modulator 31 and (ii) the TM0 polarized wave that has been obtained by the polarized wave rotator 33. The QPSK modulator 31 and 32, the polarized wave rotator 33, and the polarized beam combiner 34 are each a silicon waveguide, and are provided integrally on a common lower cladding. Note that the QPSK modulator 31 and 32 are not limited to those described above, but can be replaced by other modulators (such as OOK (On Off Keying) modulators, BPSK (Binary Phase Shift Keying) modulators, or QAM (Quadrature Amplitude Modulation) modulators).

The optical modulator 3 includes, as a polarized beam combiner 34, the substrate-type waveguide element 1 in accordance with the present embodiment. This allows the optical modulator 3 to (i) increase a polarization extinction ratio without increasing loss of a TM0 polarized wave having a wavelength outside a design wavelength and (ii) decrease, without decreasing a polarization extinction ratio, loss of a TM0 polarized wave having a wavelength outside a design wavelength.

SUMMARY

A substrate-type waveguide element of the present embodiment includes: a lower cladding; a first core and a second core which are provided on the lower cladding; and an upper cladding provided on the lower cladding so as to bury the first core and the second core, a TM polarized wave inputted into the first core being outputted from the second core, a cross section of at least a partial segment of the first core having a step-like shape including a quadrilateral shape of a main part and a quadrilateral shape of a protruding part protruding from the main part, so that an effective refractive index of a TE polarized wave in the first core differs from an effective refractive index of a TE polarized wave in the second core.

With the configuration, it is possible to increase a polarization extinction ratio without weakening optical coupling between respective TM polarized waves guided through the two cores. In other words, it is possible to increase the polarization extinction ratio without increasing loss of a TM polarized wave having a wavelength outside a design wavelength. Alternatively, it is possible to increase, without decreasing a polarization extinction ratio, optical coupling between respective TM polarized waves guided through the two cores. In other words, it is possible to decrease, without decreasing the polarization extinction ratio, loss of a TM polarized wave having a wavelength outside a design wavelength.

The substrate-type waveguide element of the present embodiment is preferably configured such that the protruding part protrudes away from the second core.

With the configuration, it is possible to more effectively restrict transfer of a TE polarized wave from the first core to the second core, so that the polarization extinction ratio can be increased more. This is because of the following reason: When a TE0 polarized wave escapes from the first core, a large proportion escapes in the vicinity of the protruding part. Therefore, in a case where the cross section of the first core has a step-like shape such that the protruding part protrudes away from the second core, optical coupling between respective TE0 polarized waves guided through the two cores is weak.

The substrate-type waveguide element of the present embodiment is configured such that a TM0 polarized wave inputted into the first core is, for example, outputted from the second core.

The substrate-type waveguide element of the present embodiment is preferably configured such that a shorter distance between the first core and the second core is relative to a further distance from an input terminal of the first core or a longer distance between the first core and the second core is relative to a closer distance to an output terminal of the first core.

With the configuration, it is possible to restrict reflection that may occur in the first core or the second core.

The substrate-type waveguide element of the present embodiment is preferably configured such that a wider width of the protruding part is relative to a further distance from an input terminal of the first core or a narrower width of the protruding part is relative to a closer distance to an output terminal of the first core.

With the configuration, it is possible to restrict loss that may occur in a case where the first core is to be connected to a waveguide whose cross section has a quadrilateral shape.

The substrate-type waveguide element of the present embodiment is preferably configured such that: a first segment of the first core has a cross section having a step-like shape whereas a second segment of the first core has a cross section having a quadrilateral shape; and a first segment of the second core, which first segment is parallel to the first segment of the first core, has a cross section having a quadrilateral shape whereas a second segment of the second core, which second segment is parallel to the second segment of the first core, has a cross section having a step-like shape.

The substrate-type waveguide element of the present embodiment is preferably configured such that: the upper cladding and the lower cladding are each made of silica; and the first core and the second core are each made of silicon.

With the configuration, it is possible to realize a substrate-type waveguide element which can be easily processed and which is capable of a reduction in device size by integration and capable of a reduction in production costs by mass production.

With the configuration, it is also possible to produce a polarization extinction ratio higher than is the case of a quartz-based planar optical waveguide (PLC: planar lightwave circuit) including an upper cladding, a lower cladding, a first core, and a second core, each of which is made of silica.

In a case where a cladding(s) is made of silica (refractive index: approximately 1.44), a core(s) made of silicon (refractive index: approximately 3.44) results in a polarization extinction ratio higher than that resulting from a core(s) made of silica (included in a quartz-based planar optical waveguide). This is because of the following reason: A relative refractive index difference between a core(s) made of silicon and a cladding(s) made of silica is larger than a relative refractive index difference between a core(s) made of silica and a cladding(s) made of silica. Therefore, a degree to which a TE polarized wave and a TM polarized wave are confined is higher in a case where a core(s) is made of silicon than in a case where a core(s) is made of silica. This causes an influence of a core structure on an effective refractive index with respect to the TE polarized wave and the TM polarized wave to be larger in the case where the core(s) is made of silicon than in the case where the core(s) is made of silica. That is, a difference in effective refractive index of TE polarized wave between the first core and the second core as a result of configuring the cross section of the first core to have a step-like shape is large in the case where the core(s) is made of silicon than in the case where the core(s) is made of silica. This means that in a case where a cladding(s) is made of silica, a core(s) made of silicon results in a polarization extinction ratio higher than that resulting from a core(s) made of silica.

The scope of the embodiment also encompasses an optical modulator including the above substrate-type waveguide element which serves as a polarized beam combiner that combines a TM polarized wave and a TE polarized wave together.

Such an optical modulator also produces advantageous effects similar to those produced by the above described substrate-type waveguide element.

ADDITIONAL REMARKS

The present invention is not limited to the description of the embodiments, but can be altered in many ways by a person skilled in the art within the scope of the claims. An embodiment derived from a proper combination of technical means disclosed in different embodiments is also encompassed in the technical scope of the present invention.

INDUSTRIAL APPLICABILITY

The present invention is suitable as a polarized beam combiner or as a polarized beam splitter. For example, the present invention is suitable as a polarized beam combiner of an optical modulator which includes a silicon waveguide(s).

REFERENCE SIGNS LIST

1 Substrate-type waveguide element
11 Lower cladding
12 Upper cladding
13 First core
13a Main part
13b Protruding part
14 Second core
14a Main part
14b Protruding part
3 Optical modulator
31 First QPSK modulator
32 Second QPSK modulator
33 Polarized wave rotator
34 Polarized beam combiner (substrate-type waveguide element)

The invention claimed is:

1. A substrate-type waveguide element comprising:
a lower cladding;
a first core and a second core which are provided on the lower cladding; and
an upper cladding provided on the lower cladding so as to bury the first core and the second core,
a TM polarized wave inputted into the first core being outputted from the second core,
a cross section of a first segment of the first core having a step-like shape including a quadrilateral shape of a main part and a quadrilateral shape of a protruding part protruding from the main part, so that an effective refractive index of a TE polarized wave in the first segment of the first core differs from an effective refractive index of a TE polarized wave in a first segment of the second core, the first segment of the second core being parallel to the first segment of the first core.

2. The substrate-type waveguide element as set forth in claim 1, wherein the protruding part protrudes away from the second core.

3. The substrate-type waveguide element as set forth in claim 1, wherein a TM0 polarized wave inputted into the first core is outputted from the second core.

4. The substrate-type waveguide element as set forth in claim 1, wherein a shorter distance between the first core and the second core is relative to a further distance from an input terminal of the first core or a longer distance between the first core and the second core is relative to a closer distance to an output terminal of the first core.

5. The substrate-type waveguide element as set forth in claim 1, wherein a wider width of the protruding part is relative to a further distance from an input terminal of the first core or a narrower width of the protruding part is relative to a closer distance to an output terminal of the first core.

6. The substrate-type waveguide element as set forth in claim 1, wherein:
a second segment of the first core has a cross section having a quadrilateral shape; and
the first segment of the second core has a cross section having a quadrilateral shape whereas a second segment of the second core, which second segment is parallel to the second segment of the first core, has a cross section having a step-like shape.

7. The substrate-type waveguide element as set forth in claim 1, wherein:
the upper cladding and the lower cladding are each made of silica; and
the first core and the second core are each made of silicon.

8. An optical modulator comprising:
a substrate-type waveguide element recited in claim 1, which substrate-type waveguide element serves as a polarized beam combiner that combines a TM polarized wave and a TE polarized wave together.

9. The substrate-type waveguide element as set forth in claim 1, wherein the cross section of the first segment of the first core has a step-like L-shape including the main part and the protruding part protruding from a lower part of the main part in a direction away from the second core.

10. The substrate-type waveguide element as set forth in claim 1, wherein the first segment of the second core has a cross section having a quadrilateral shape.

* * * * *